United States Patent [19]

Grim

[11] Patent Number: 4,877,169

[45] Date of Patent: Oct. 31, 1989

[54] SELF-TIGHTENING VEHICLE ROOF RACK

[75] Inventor: Michael Grim, Bayside, Calif.

[73] Assignee: Yakima Products, Inc., Arcata, Calif.

[21] Appl. No.: 168,786

[22] Filed: Mar. 15, 1988

[51] Int. Cl.[4] .............................................. B60R 9/04
[52] U.S. Cl. ................................... 224/331; 224/320; 224/322
[58] Field of Search ............... 224/309, 314, 315, 320, 224/322, 324, 325, 326, 327, 321, 329, 330, 331, 323, 310; 403/374, 233, 234, 235; 296/37.7

[56] References Cited

U.S. PATENT DOCUMENTS

| 431,745 | 7/1890 | Haven | 403/374 X |
|---|---|---|---|
| 3,064,868 | 11/1962 | Treydte | 224/331 X |
| 3,273,768 | 9/1966 | Duer | 224/315 |
| 3,837,547 | 9/1974 | Joos | 224/331 |
| 4,496,089 | 1/1985 | Eklund | 224/320 X |
| 4,586,638 | 5/1986 | Prescott et al. | 224/320 X |
| 4,688,706 | 8/1987 | Thulin | 224/320 X |

FOREIGN PATENT DOCUMENTS 3532170 3/1987 Fed. Rep. of Germany ...... 224/309

Primary Examiner—Harvey C. Hornsby
Assistant Examiner—Scott J. Haugland
Attorney, Agent, or Firm—Townsend and Townsend

[57] ABSTRACT

A crossbar on a vehicle roof rack is supported by a pair of pedestals through a cam on each pedestal which exerts its clamping action by rotating toward the center of the vehicle, each cam operating independently of the fastening clip which secures each pedestal to the vehicle roof. The direction of the clamping rotation of the cams and the rate of increase of the radius of each cam as it rotates in the clamping direction provides the cams with a self-tightening effect—i.e., should the apparatus ever begin to loosen after the cam is engaged, any pulling apart of the pedestals will cause the crossbar to draw itself over the cam, causing the cam to rotate in the tightening direction and re-secure the crossbar.

9 Claims, 4 Drawing Sheets

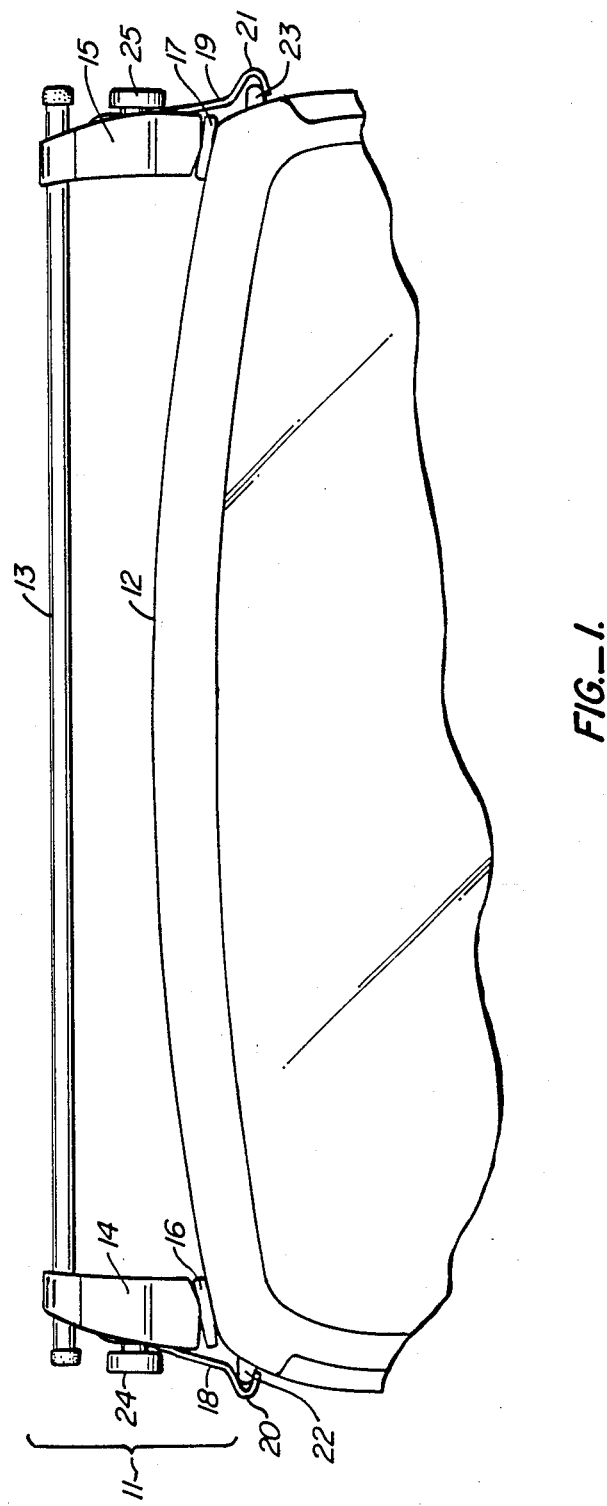
FIG._1.

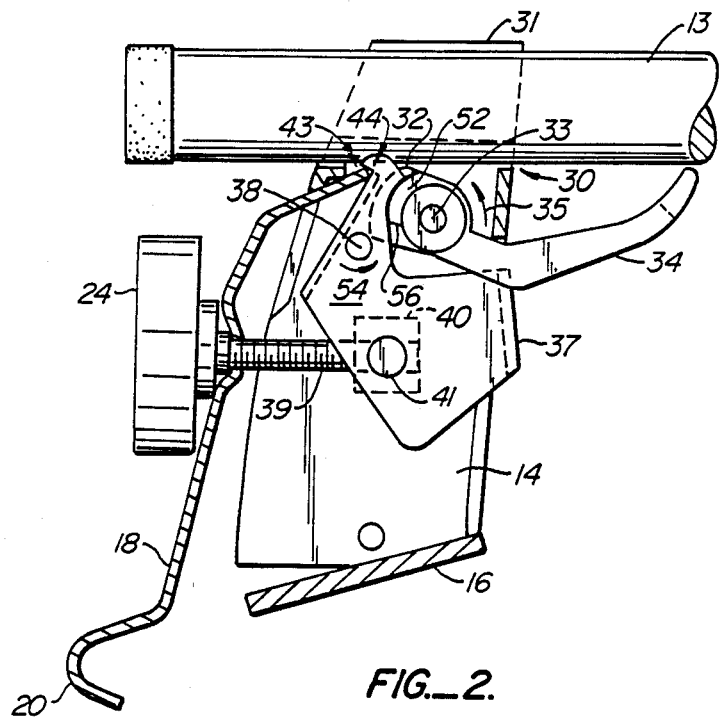
FIG._2.
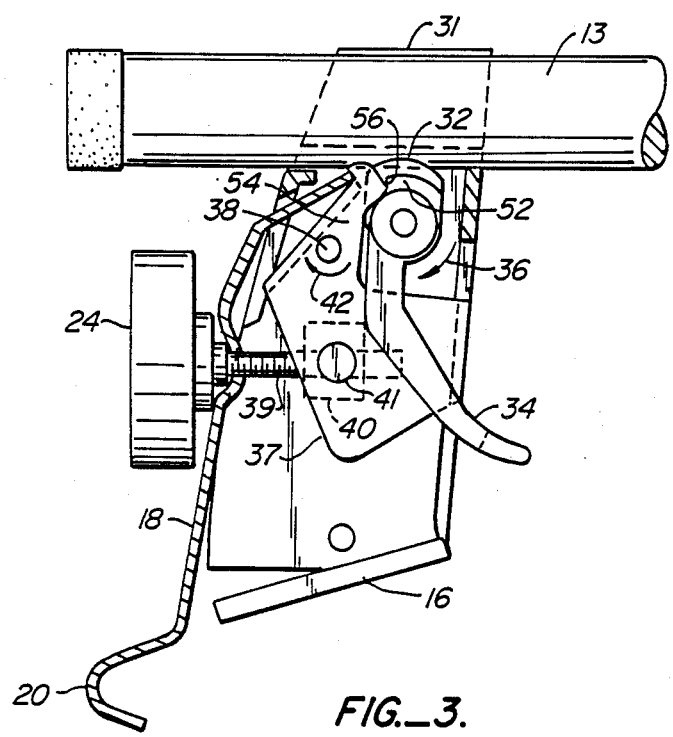
FIG._3.

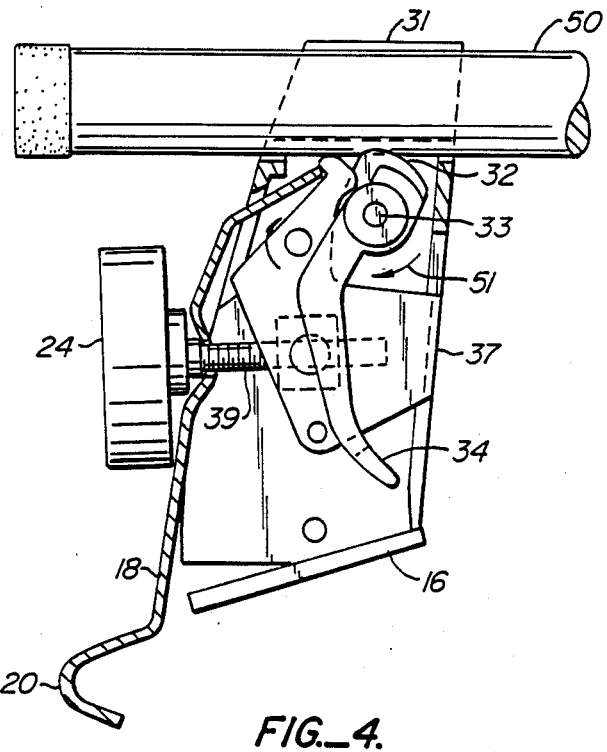
FIG._4.
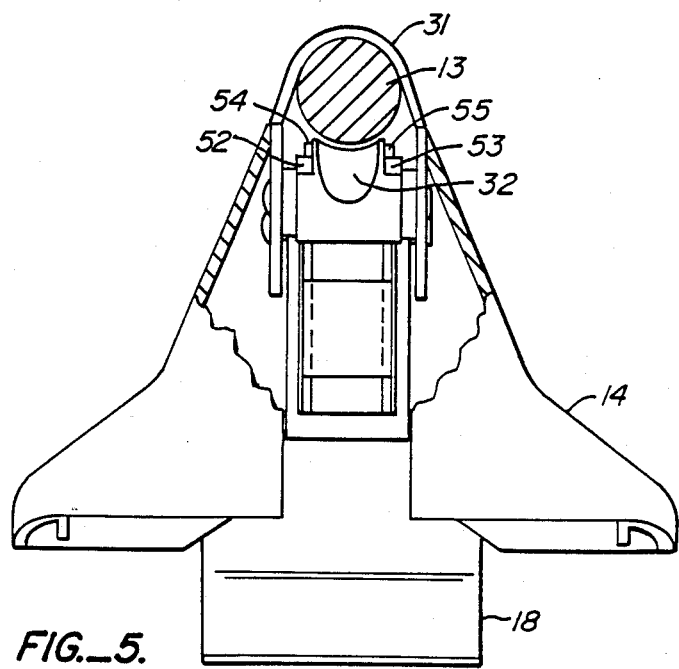
FIG._5.

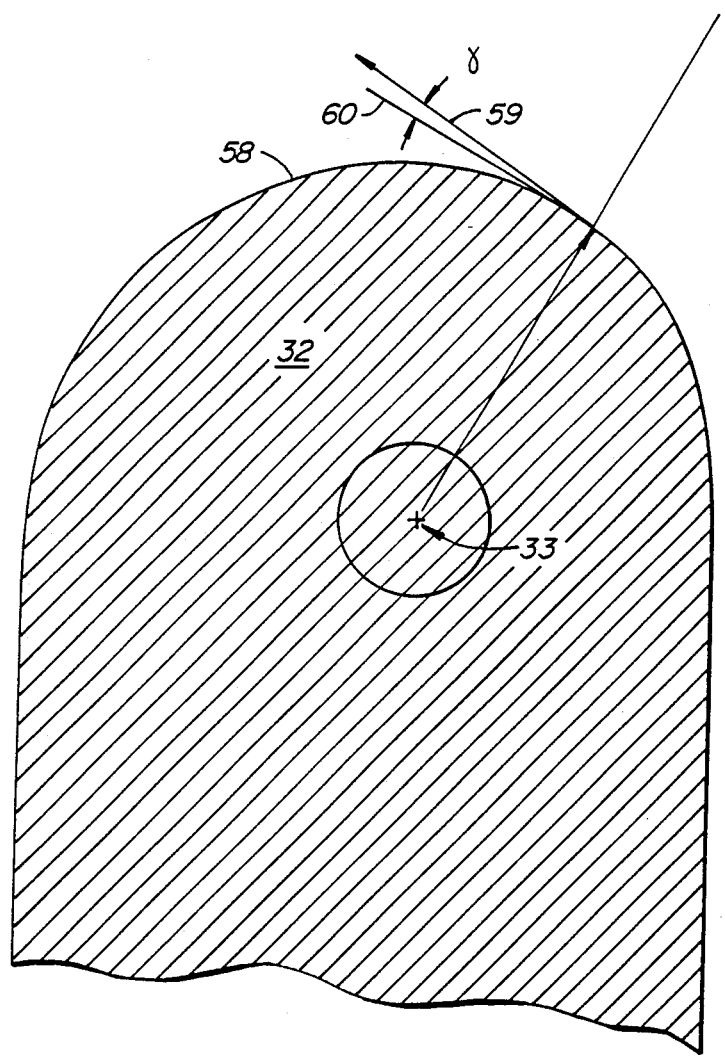
FIG._6.

SELF-TIGHTENING VEHICLE ROOF RACK

This invention relates to vehicle roof accessories, and more particularly to carrier racks designed for mounting to the roof of vehicles such as automobiles to support cargo, recreational equipment and the like.

BACKGROUND AND SUMMARY OF THE INVENTION

Roof racks for automobiles have been described and manufactured in a wide variety of designs, depending on the design of the particular roofs to which the racks are to be mounted, the means of mounting the rack to the roof, the shape and height of the crossbar, the method of clamping the crossbar (most often a separate piece) to the rack posts, and the degree to which the rack is adjustable for use on vehicles of different sizes. Critical to the design of all roof racks are an effective means of securing the rack to the roof in such a manner that it will not readily loosen when subjected to the jostling typically encountered as a result of the motion of the vehicle, particularly on rough roads. Much attention has also been directed to designing roof racks which are easy to assemble and secure to the vehicle roof. To this end, structures have been designed to provide for a single mechanism for clamping the crossbar to a support post or pedestal and the pedestal to the roof simultaneously. Examples of these may be found in Eklund, U.S. Pat. No. 4,496,089, Jan. 29, 1985; Thulin, U.S. Pat. No. 4,688,706, Aug. 25, 1987; and Prescott et al., U.S. Pat. No. 4,586,638, May 6, 1986.

The force vector which these mechanisms exert on the vehicle-clamping portion has vertical and horizontal components. The horizontal component holds the rack on the vehicle, and it can be very large without causing roof damage. The vertical component, on the other hand, is largely transverse to the roof surface.

Crossbars are generally of rigid, sturdy construction, permitting them to accommodate a large amount of clamping force without crimping. A high clamping force on the crossbar is frequently required to ensure against loosening, which not only disturbs the load being carried by the crossbar but also loosens the pedestal attachment to the vehicle. Typical automobile roofs, on the other hand, are made of thin sheet metal, and are not designed to support weight or excessive force. With many roof designs, there is a risk of denting the roof when tightening down one of these unitary mechanisms sufficiently to secure the crossbar to the pedestal, due to the vertical component of the force vector.

The problem is sometimes aggravated by the use of crossbars of different sizes. Industry standards require roof racks to be capable of accommodating all available crossbars within manufacturing tolerances. Most roof racks, however, are designed primarily for a certain size of crossbar. When crossbars of a size other than the design size are used, either larger or smaller, operators frequently try to compensate by tightening down the clamping mechanism even more, regardless of whether or not it is necessary to do so. The result is frequently a dent in the roof.

The present invention provides a vehicle roof rack structure which offers a number of advantages. The clamping of the crossbars to each of the pedestals is accomplished by cams facing inward, so that each cam exerts its clamping force by rotating in the direction toward the opposing pedestal, i.e., toward the center of the rack. In the event that vehicle jostling causes the cams to loosen and the pedestals to begin to move apart as a result, the crossbar will cause rotation of the cam due to friction at its contact surface to a tighter clamping position. This self-tightening of each of the cams acts as a check against loosening of the crossbar and disengagement of the entire structure from the vehicle roof. The construction disclosed herein also provides for independent clamping action of the crossbar to the pedestal on the one hand and the pedestal to the roof on the other, permitting the two clamping forces to be varied independently to meet their individual needs. Preferred embodiments of the invention include releasable limits or stops which lock the cams in their clamping position, further ensuring against inadvertent release due to jostling. In preferred embodiments, the engagement of these stops is achieved by the vehicle clamping mechanism, so that the cams are automatically locked in place upon securing the rack to the vehicle.

Further features, advantages and embodiments will be apparent from the following description.

BRIEF DESCRIPTION OF THE DRAWINGS

FIG. 1 is a front elevation view of a vehicle roof rack in accordance with the present invention, shown attached to the roof of a vehicle.

FIG. 2 is an enlarged view of one end of the vehicle roof rack shown in FIG. 1, in partial cutaway, with the crossbar clamp and the roof clamp both in open positions.

FIG. 3 is a view similar to that of FIG. 2, showing the crossbar clamp and the roof clamp both in closed positions.

FIG. 4 is a view similar to that of FIG. 3, with a crossbar of smaller diameter and with the cam rotated further to achieve the same clamping effect as in FIG. 3.

FIG. 5 is an inside elevation view of the pedestal shown in FIGS. 2, 3 and 4, viewed from the side facing the center of the vehicle, in partial cutaway.

FIG. 6 is a cutaway view of the cam portion of the crossbar clamp forming part of the structure shown in FIGS. 2, 3 and 4.

DETAILED DESCRIPTION OF THE INVENTION AND PREFERRED EMBODIMENTS

An example of a roof rack structure in accordance with the present invention is illustrated in FIG. 1. In this illustration, the roof rack 11 is shown mounted to the roof 12 of an automobile. The roof rack itself consists of a crossbar 13 supported by a pair of pedestals or towers 14, 15, each having at its base a base pad 16, 17 of rubber or like resilient material to provide added grip when compressed against the roof surface, and with the capability of pivoting to a small extent to accommodate the angle of the roof. The two pedestals are mirror images of each other, and extending from the outer surface of each is a fastening clip 18, 19. The fastening clips have inwardly curved or bent lower ends 20, 21 which engage the rain gutters 22, 23 along the edge of the vehicle roof, or any accessible edge or protruding portion of the roof or side of the vehicle body which can be similarly gripped. Each of the pedestals has a hand wheel 24, 25 by which the fastening clip is tightened against the rain gutter.

FIG. 2 shows the left end of the roof rack in cutaway. The crossbar 13 passes through an opening 30 at the top of the pedestal, formed by a hood or loop 31 secured immovably to the top of the pedestal. With the apparatus in the condition shown in FIG. 2, the crossbar 13 loosely fits in the opening 30 and can easily be slid in the longitudinal direction (left and right in this view).

The clamping of the crossbar 13 to a rigid non-sliding position in the pedestal is achieved by a cam 32 which rotates about a pivot axis 33. The cam is manually manipulated by a cam lever 34, which is a rigid extension of the cam on the opposite side of the pivot axis 33. When the cam lever is rotated in the direction of the arrow 35 (FIG. 2) to the position shown in FIG. 2, the cam 32 is out of contact with the crossbar 13. FIG. 3, however, shows the cam lever 34 rotated clockwise in the direction shown by the arrow 36. In this position, the cam 32 is in contact with the underside of the crossbar 13 pushing it up against the hood 31. Although not visible in this drawing, the contact surface of the cam 32 is curved in the concave direction (in the plain perpendicular to the plain of the drawing) to complement the curvature of the crossbar 13 and provide a snug fit.

A comparison between FIGS. 2 and 3 also shows two positions of the fastening clip 18. The fastening clip is joined to a swing body or pivoting member 37 which is mounted to the pedestal in pivotal manner at a pivot axis 38. The connection between the fastening clip 18 and the swing body 37 is achieved by a threaded stud 39 which passes through the fastening clip 18 and mates with a threaded pivoting nut 40. The pivoting nut 40 is itself mounted pivotally to the swing body 37 through a pivot pin 41 which defines its pivot axis. The threaded stud 39 terminates in the hand wheel 24. Starting with the clip in the position shown in FIG. 2, the operator tightens the clip to secure the pedestal to the vehicle roof by turning the hand wheel 24 clockwise. This screws the threaded stud 39 into the pivoting nut 40, causing the nut to pivot as needed to maintain alignment with the stud, and drawing the nut toward the hand wheel. This both pulls the fastening clip 18 inward (toward the right) and pivots the swing body 37 clockwise (in the direction shown by the arrow 42). The upper end 43 of the fastening clip abuts a shoulder 44 on the swing body 37, forming a direct pivoting contact between the two.

The versatility of the cam to clamp crossbars of smaller diameter is demonstrated in FIG. 4. Here the crossbar 50 is of lesser diameter than the crossbar 13 shown in FIGS. 2 and 3. To clamp this thinner crossbar up against the hood 31, the cam lever 34 is rotated further in the clockwise direction to the position shown in FIG. 4. A higher portion of the cam 32 is thus brought into contact with the undersurface of the crossbar 50.

It will be noted that the cam, as indicated by the drawings, is actually a curved wedge, whose contacting surface has a concave cross-section in the plain perpendicular to that of the drawing and a convex cross-section in the plain parallel to that of the drawing. The distance from the pivot axis 33 of the cam to the center line of the contact surface increases in the counterclockwise direction so that any rotation of the cam lever 34 in the clockwise direction, as indicated by the arrow 51 in FIG. 4, raises the contact point and causes greater force to be exerted upward on the crossbar. The curved wedge will generally form an arc of at least about $\pi/4$ radians, preferably at least about $\pi/3$ radians. In a design which has been found to be particularly effective, the curved wedge forms an arc of 98° ($\pi/1.8$ radians), providing potential for contact over an arc of 75.5° ($\pi/2.4$ radians).

By virtue of the shape and orientation of the cam, any slight loosening of the cam, such as might occur as a result of jostling the cam to rotate in the counterclockwise direction, would tend to permit the two pedestals to separate (without the crossbar rigidly holding them together). The counterforce of the crossbar, however, which would be toward the right in the view shown in FIGS. 2–4, tends to pull the cam 32 along with it, rotating the cam in the clockwise direction toward a tighter fit. The result is a self-tightening action. This may be assisted by modifying the contact surface of the cam to increase the contact friction. This may be done in any conventional way, including roughening or texturing the contact surface or bonding to it a layer of non-slippery material such as rubber or the like. A crossbar which has been found to be particularly effective is one which is die-cast zinc alloy with a texture which has been molded in.

A further feature of the structure shown in the drawings is a lock or stop mechanism which helps prevent the cam 32 from slipping out of engagement with the crossbar 13. This mechanism consists of a truncated shoulder 52 on either side of the cam surface. This may also be seen in FIG. 5, where both shoulders 52, 53 are shown. The shoulders are aligned and in contact with the upper ends of the side panels 54, 55 of the swing body 37. The shoulders are truncated rather than extending all the way around the pivot axis 33. The truncated end 56 serves as a stop to limit the rotation of the cam in the counterclockwise direction (i.e., the opening direction). This stop is engaged by the upper end of the side panel 54 of the swing body when the swing body is rotated to the position shown in FIG. 3. Thus, once the cam lever 34 is lowered to engage the cam against the crossbar 13, and the hand wheel 24 is tightened to draw the fastening clip 18 inward into its clamping position, the swing body is rotated clockwise so that its side panels engage the cam stop 56, locking the cam into position against crossbar 13. The clamping forces applied by the cam 32 and the clip 18, however, remain independently controllable.

It will be noted that with the cam in the position shown in FIG. 4, the cam stop 56 is no longer engaged.

The selection of an appropriate cam profile for the cam 32, i.e., the radius of the cam and its rate of increase as the cam is turned, will be selected in accordance with the dimensions of the other components of the system and their relative placement in the overall construction. In general, as noted, the cam radius will increase in the counterclockwise direction (in the views shown in FIGS. 2-4). The dimensions, shapes and rate of increase are generally within the routine skill of those skilled in the art. Following the central line along the contact surface of the cam, i.e., encircling the pivot axis 33, a curve is defined which is eccentric with respect to the pivot axis. This curve is shown in FIG. 6, where it is designated by the number 58. Self-tightening is achieved when the tangent of the angle $\gamma$ defined by the tangent 59 of the curve 58 at any given point on the curve and a line 60 perpendicular to the radial line passing through the point and the center of the pivot axis 33 is less than the coefficient of friction $\mu$ between the cam and the crossbar. For a given force tending to separate pedestals, the self-tightening crossbar cam will provide greater crossbar clamping force for a smaller angle ($\gamma$) defined above. The maximum crossbar clamping force is achieved as the angle approaches zero, but the self-tightening effect occurs for all angles ($\gamma$) whose tangent is less than $\mu$.

It may also be noted that in the optimum configuration of the stop mechanism, the truncated end 56 of the cam shoulder 52 is at an acute angle to the contacting edge of the swing body side panel 54 which it engages. This facilitates the release of the various clamping mechanisms. When removing the structure from the vehicle roof, one will first turn the hand wheel to release the tension on the fastening clip 18, leaving the swing body 37 free to rotate. Actual rotation of the swing body may then be achieved by manually pulling up on the cam lever 34. The angle of contact between the truncated shoulder end 56 and the contacting surface on the swing body side panel 54 causes the contacting surface to slide up the truncated end 56, thereby releasing the stop and permitting the cam to disengage from the crossbar.

The foregoing is offered primarily for purposes of illustration. It will be readily apparent to those skilled in the art that numerous variations, modifications and substitutions of the various elements of structure, function and operation described herein may be made without departing from the spirit and scope of the invention.

What is claimed is:

1. A self-tightening vehicle roof rack comprising:
   a crossbar;
   a pair of pedestals, each having an inner face and an outer face;
   a pair of cams; one such cam rotatably mounted to each said pedestal, and arranged thereon to clamp said crossbar to said pedestal upon rotation of said cam toward the other pedestal;
   a pair of threaded studs, one such threaded stud accessible through an opening in each said outer face, operable independently from said cams, for securing each said pedestal to said vehicle roof; and
   lever means, mounted to each said pedestal and accessible through an opening in said inner face, for manually rotating each said cam into a position clamping said crossbar to said pedestal independently of said threaded studs.

2. A self-tightening vehicle roof rack in accordance with claim 1 in which each said cam is constructed to exert a clamping force which increases progressively as said cam is rotated toward the other pedestal.

3. A self-tightening vehicle roof rack in accordance with claim 1 in which the radius of each said cam increases substantially linearly with the angle of rotation of said cam with respect to said pedestal.

4. A self-tightening vehicle roof rack in accordance with claim 1 in which the radius of each said cam increases substantially linearly with the angle of rotation of said cam with respect to said pedestal through an arc of at least about $\pi/4$ radians.

5. A self-tightening vehicle roof rack in accordance with claim 1 in which the radius of each said cam increases substantially linearly with the angle of rotation of said cam with respect to said pedestal through an arc of at least about $\pi/3$ radians.

6. A self-tightening vehicle roof rack in accordance with claim 1 in which each said pedestal has an upper end terminating in a hood member defining an opening for passage of said crossbar, and a lower end adapted to contact said vehicle roof, and said cam is arranged on said pedestal to urge said crossbar upward against said hood member.

7. A self-tightening vehicle roof rack in accordance with claim 1 in which each said cam has a friction-bearing contact surface in contact with said crossbar.

8. A self-tightening vehicle roof rack in accordance with claim 1 in which each said cam has a contour defining a cam profile in the plane of rotation of said cam, and at each point on said cam profile said cam has a coefficient of friction equal to or greater than the tangent of the angle formed by a line tangent to said cam profile at said point and a line perpendicular to the radial line joining said point with the pivot axis of said cam.

9. A self-tightening vehicle roof rack in accordance with claim 1, further comprising a pivoting member pivotally mounted to said pedestal to pivot upon securing said pedestal to said vehicle roof, and said vehicle roof rack further comprises a stop mounted to each said cam for engagement by said pivoting member to prevent release of said crossbar from said cam.

* * * * *